United States Patent [19]

Sim et al.

[11] Patent Number: 5,775,616
[45] Date of Patent: Jul. 7, 1998

[54] TAPE TENSION CONTROL APPARATUS FOR VIDEO CASSETTE TAPE RECORDER

[75] Inventors: Kwan Bo Sim; Mun Chae Joung, both of Seoul, Rep. of Korea

[73] Assignee: LG Electronics Inc., Seoul, Rep. of Korea

[21] Appl. No.: 587,704

[22] Filed: Jan. 19, 1996

[30] Foreign Application Priority Data

Jan. 20, 1995 [KR] Rep. of Korea ............... 807/1995

[51] Int. Cl.$^6$ .................................................. G11B 15/43
[52] U.S. Cl. .................................... 242/353; 242/334.6
[58] Field of Search ............................. 242/334, 334.6, 242/353, 355, 356, 356.3; 360/85, 96.3, 96.4

[56] References Cited

U.S. PATENT DOCUMENTS

| | | | |
|---|---|---|---|
| 2,985,396 | 5/1961 | Johnson | 242/334.6 |
| 3,360,174 | 12/1967 | Evert | 242/353 |
| 3,517,895 | 6/1970 | Kraft | 242/334.6 |
| 5,460,334 | 10/1995 | Joung | 242/334.6 |
| 5,504,635 | 4/1996 | Lee | 242/334.6 |
| 5,543,980 | 8/1996 | Fukuzawa | 242/334 |

FOREIGN PATENT DOCUMENTS

| | | | |
|---|---|---|---|
| 59-201255 | 11/1984 | Japan | 242/353 |
| 60-40549 | 3/1985 | Japan | 242/334.6 |
| 3-100954 | 4/1991 | Japan | 242/334.6 |

*Primary Examiner*—John P. Darling
*Attorney, Agent, or Firm*—Birch, Stewart, Kolasch & Birch, LLP

[57] ABSTRACT

An improved tape tension control apparatus for a VCR capable of preventing tape from getting out of a tension post due to the rapid movement of a tension arm by providing a tension arm movement delay member at the time of loading/unloading the tape, which includes a tension arm movement delay member disposed at a predetermined portion of the tension arm for preventing a rapid movement of the tension arm at the time of loading/unloading the tape.

8 Claims, 6 Drawing Sheets

TAPE TENSION CONTROL APPARATUS FOR VIDEO CASSETTE TAPE RECORDER

BACKGROUND OF THE INVENTION

1. Field of the Invention

The present invention relates to a tape tension control apparatus for a video cassette tape recorder (VCR), and particularly to an improved tape tension control apparatus for a VCR capable of preventing tape from getting out of a tension post due to the rapid movement of a tension arm at the time of loading/unloading the tape by providing a tension arm movement delay member

2. Description of the Conventional Art

FIG. 1 shows a conventional tape tension apparatus for a VCR, which includes a tension post 1 fixed to one end of a tension lever 2, and a spring 3 connected to the other end of the same. One end of a tension band 5 which wound on the outer circumferential surface of a supply reel table 7 is fixed to a base plate using a fixing pin 6, and the other end of the same is connected to a connection plate 4 which is in cooperation with the tension lever 2, so that the tension of a tape 9 can be controlled.

The conventional VCR is directed to partially winding the tape 9, which is wound on a take-up reel 8 from the supply reel 7 in the play mode, on the outer circumferential surface of the tension post 1, so that the tape can be run in cooperation with a friction transfer force which is applied thereto from a capstan 13 and a pinch roller 14 which are partially in contact with the outer circumferential surface of a rotary head drum 12.

In addition, during the running of the tape 9, when the tension of the tape 9 is increased, the tension lever 2 rotates clockwise about a shaft 19 due to the tension of the tape 9, and when the contacting state between the tension band 5 and the supply reel 7 becomes loosened, the spooling amount of the tape is increased, and the tension of the tape 9 is slightly controlled. On the contrary, when the tension of the tape is decreased, the tension lever 2 rotates clockwise about the shaft 19 due to the elastic force of the spring 3, and as the tension band 5 is in elastic contact with the supply reel 7, the spooling amount of the tape 9 is decreased and the tension of the tape 9 is more tightly controlled, so that the tension of the tape 9 is constantly maintained due to the above-mentioned operations.

However, the convent tension control apparatus for a VCR has problems in more accurately controlling the tension of the tape because newly developed products requires various requirements.

In order to overcome the above-mentioned problems, another type of the tape tension control apparatus for a VCR has been introduced. That is, FIG. 2 shows another conventional tension control apparatus for a VCR, which includes a tension post 41 disposed between guide posts 26 and 27 and being in contact with the inner surface of a tape, a tension arm 42 of which its one end is connected to the tension post 41 and its other end is engaged to a shaft 43 of the plate, a tension applying member 40 having an elastic member 44 which permits the tension post 41 to elastically contact with the tape T by elastically supporting the tension 42 in the counterclockwise direction, a tension band 51 having a friction member provided at its inner side and partially wound on the supply reel 21 and applying a certain friction force to the supply reel 21, a tension automatic control member 50 having a bad control apparatus 60 for pulling the tension band 51 in accordance with a tension of the tape, and a tension detection member (not shown) for detecting the tension of the tape.

In the drawings, reference numeral 21 denotes a supply reel, 22 denotes a take-up reel, 23 denotes a rotary head drum. A guide post 24, a guide roller 25, guide posts 26 and 27, and an audio erasing head 28 are provided between the supply reel 21 and the rotary head drum 23, and the guide roller 29 which is movable on a slant post assembly (not shown) and the slant post 30 are provided between the audio erasing head 28 and the rotary head drum 23, and the guide roller 31 which is movable together with the slant post assembly and the slant post 32 are provided between the rotary head drum 23 and the take-up reel 22, and a capstan shaft 34 and the a pinch roller 33 are provided.

However, the another conventional tape tension control apparatus has disadvantages in that when the tension arm changes to the play mode, and the tension post 41 loads the tape as the tension arm 42 is rotated, the proceeding is restricted by the guide post 24, and the supply reel 21 is stated by the inertia force, and the tape T is spooled, and the tape does not tightly contact with the tension post 41, and the tape gets out of the tension post 41 and becomes loosened Therefore, the tape T does not contact with the guide roller 29, the slant post 32, and the pinch roller 33, so that the lower portion of the tape is crumpled and curled.

In addition, when the position of the tension post 41 moves clockwise in the FF mode and the REW mode, and the tension of the tape is decreased, and when the tension post 41 moves to a stop mode section in the stop mode, the tension arm rapidly moves, so that the tape and the tension post 41 become loosened, and the tape is damaged at the time of converting the modes.

SUMMARY OF THE INVENTION

Accordingly, it is an object of the present invention to provide a tape tension control apparatus for a VCR, which overcome the problems encountered in a conventional tape tension control apparatus for a VCR.

It is another object of the present invention to provide an improved tape tension control apparatus for a VCR capable of preventing tape from getting out of a tension post due to the rapid movement of a tension arm at the time of loading/unloading the tape by providing a tension arm movement delay member.

To achieve the above objects, there is provided a tape tension apparatus for a VCR, which includes a tension arm movement delay member disposed at a predetermined portion of the tension arm for preventing a rapid movement of the tension arm at the time of loading/unloading the tape.

DETAILED DESCRIPTION OF THE INVENTION

Figure 1:
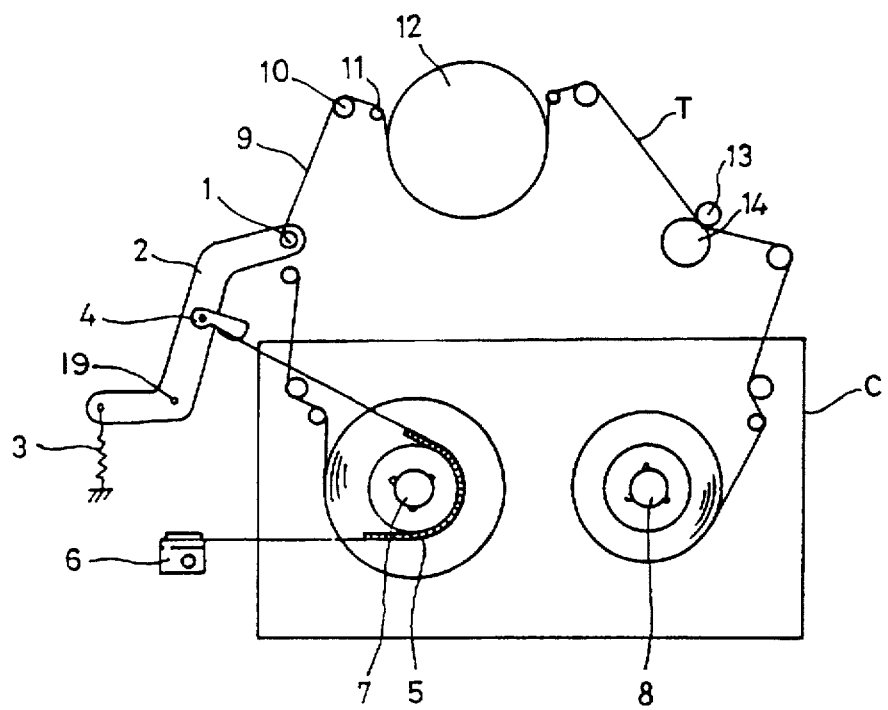
FIG. 1 is a plan view showing a conventional tape tension apparatus for a VCR.
Figure 2:
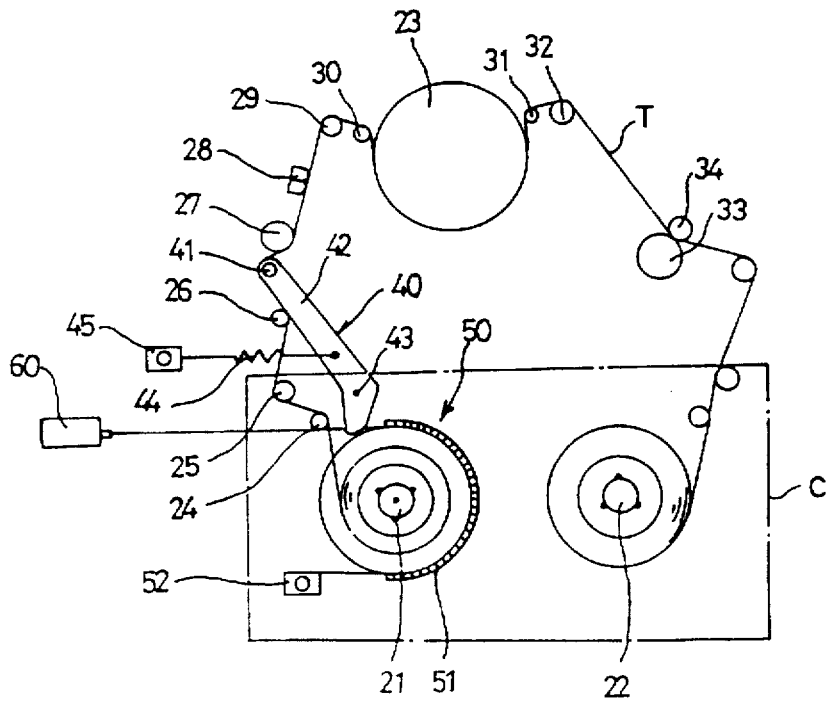
FIG. 2 is a plan view showing another conventional tape tension apparatus for a VCR.
Figure 3:
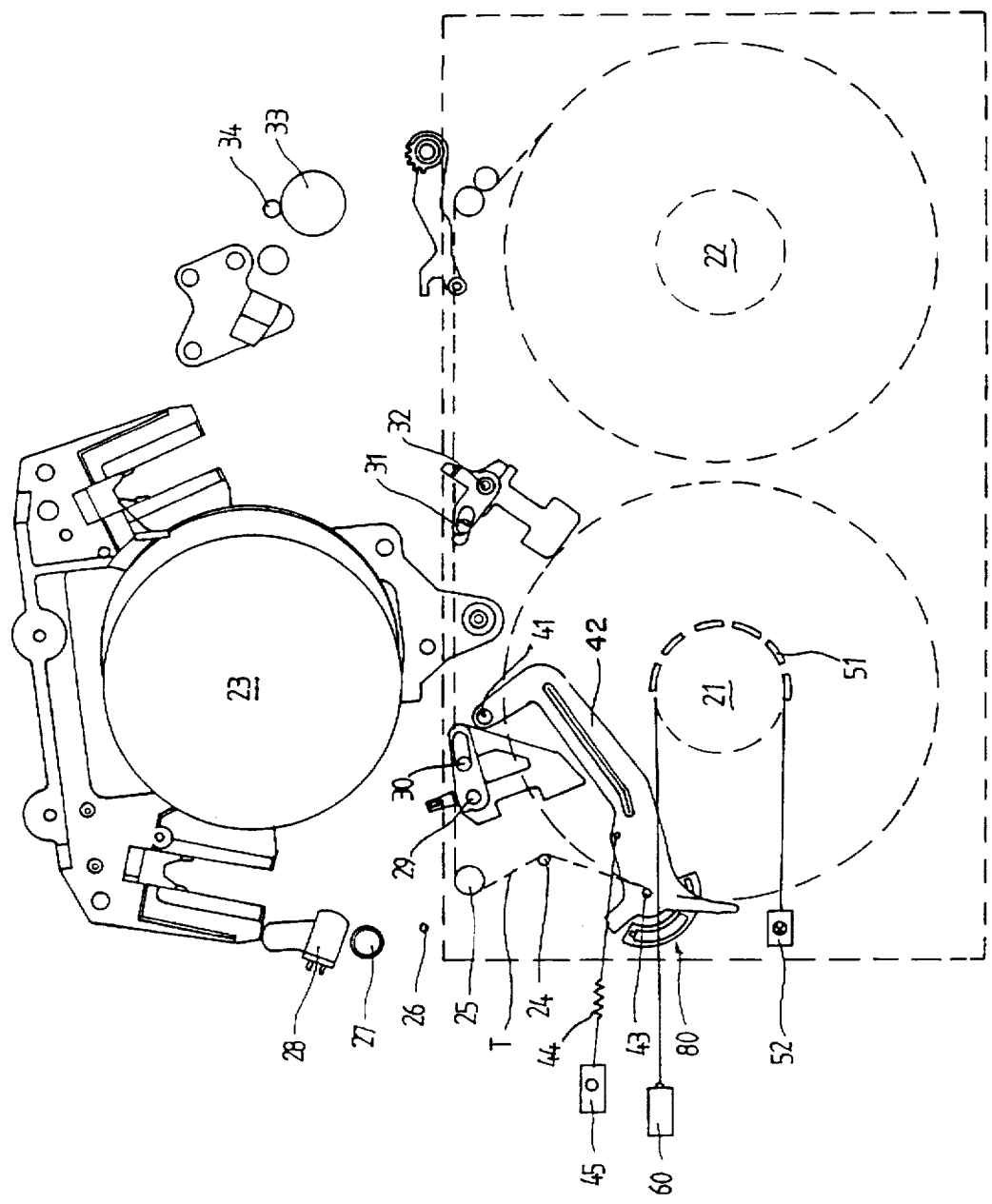
FIG. 3 is a plan view showing a tape tension control apparatus for a VCR when a tape running system is in a unloading mode according to the present invention.
Figure 4:
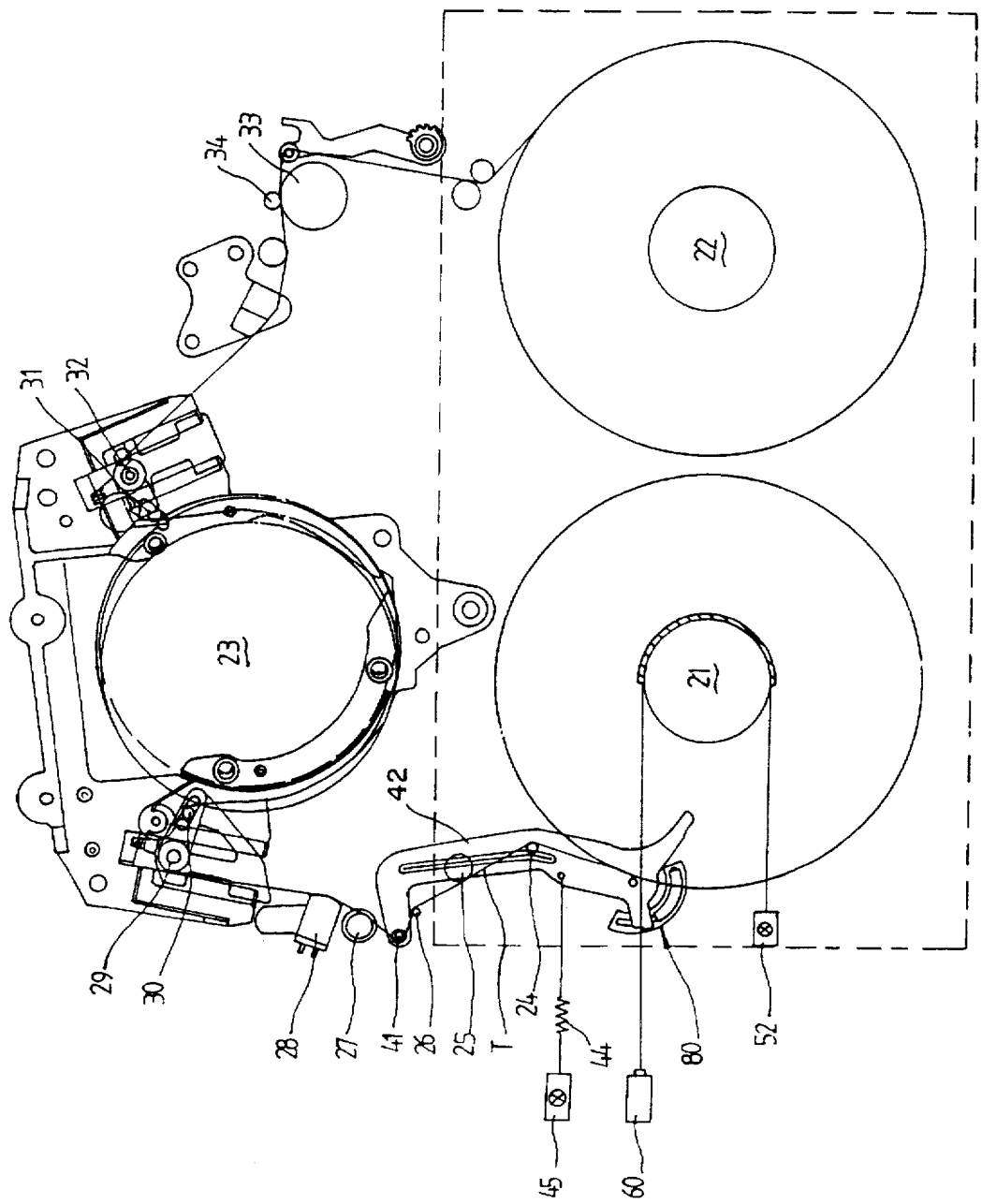
FIG. 4 is a plan view showing a tape tension control apparatus for a VCR when a tape running system is in a loading mode according to the present invention
Figure 5:
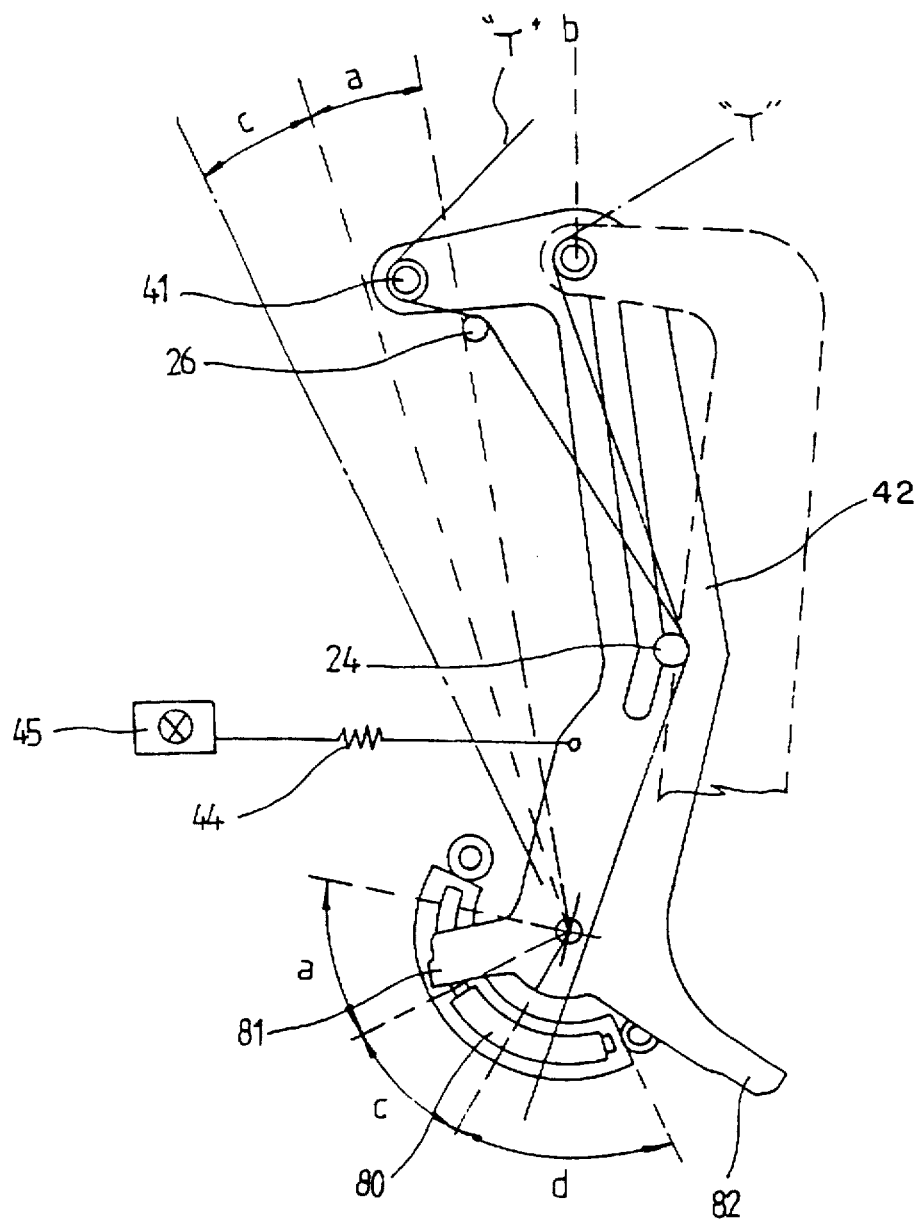
FIG. 5 is a plan view showing a tape tension control apparatus for a VCR so as to illustrate positions of corresponding elements in accordance with an operation of the tape tension control apparatus according to the present invention.
Figure 6A:
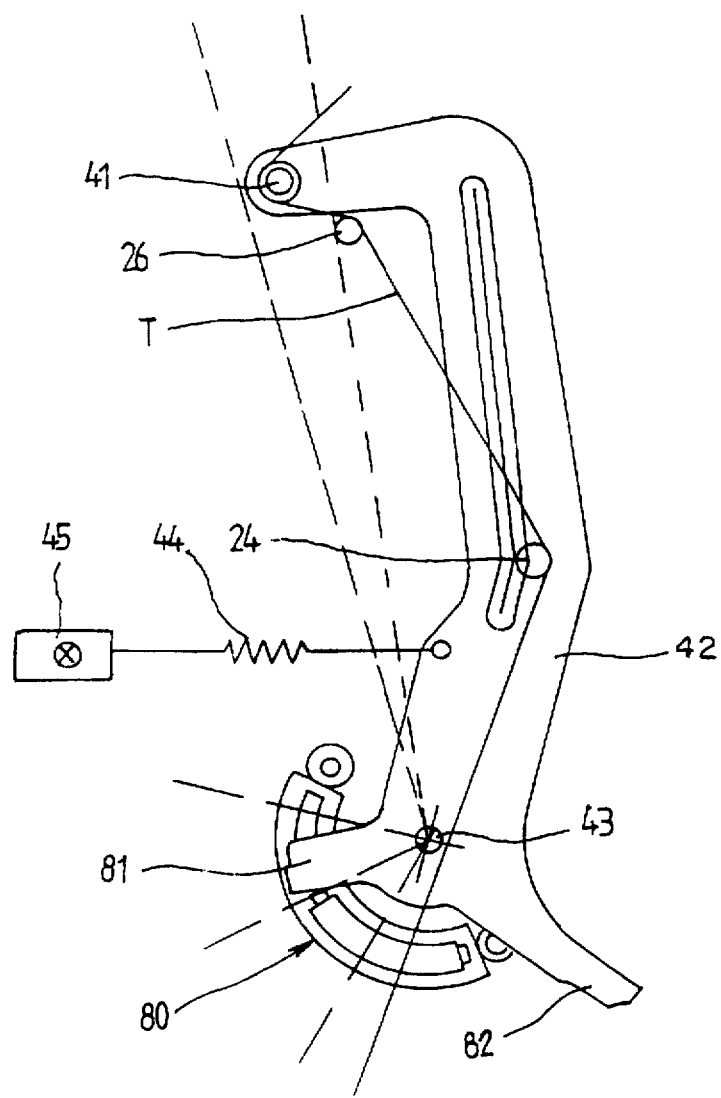
FIG. 6A is a plan view showing a tape tension control apparatus for a VCR so as to illustrate a position of the tape tension control apparatus when a tape running system is in a loading mode according to the present invention.
Figure 6B:
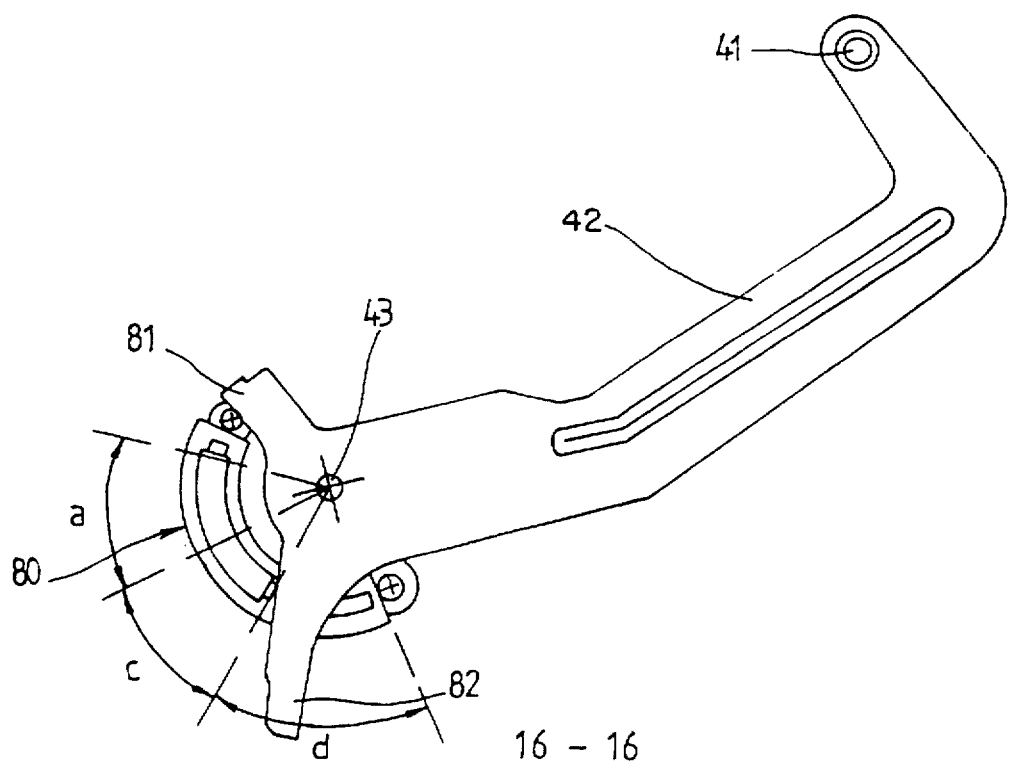
FIG. 6B is a plan view showing tape tension control apparatus for a VCR so as to illustrate a position of the tape tension control apparatus when a tape running system is in a unloading mode according to the present invention.

FIG. 3 shows a tape tension control apparatus for a VCR when a tape running system is in a unloading mode according to the present invention, and FIG. 4 shows a tape tension control apparatus for a VCR when a tape running system is in a loading mode according to the present invention, and FIG. 5 shows a tape tension control apparatus for a VCR so as to illustrate positions of corresponding elements in accordance with an operation of the tape tension control apparatus according to the present invention, and FIG. 6A shows a tape tension control apparatus for a VCR so as to illustrate a position of the tape tension control apparatus when a tape running system is in a loading mode according to the present invention, and FIG. 6B shows a tape tension control apparatus for a VCR so as to illustrate a position of the tape tension control apparatus when a tape running system is in an unloading mode to the present invention.

As shown therein, the tape tension control apparatus for a VCR includes a damper 80 for preventing a rapid movement of a tension arm at the time of loading/unloading disposed at one side of the tension arm 42. Here, the damper 80 serves as a tension arm movement delay member.

Damper pushing arms 81 and 82 are projected at one end of the tension arm 42 with which the damper 80 contacts for moving the damper 80 by the movement of the tension arm.

The damper pushing 81 and 82 are spaced apart by a predetermined distance so that the damper 80 can not restrict the movement of the tension arm 42.

The operation and effects of the tape tension control apparatus for a VCR according to the present invention will be explained with reference to the drawings.

In the tape loading mode when the tension arm is rotated in cooperation with the elastic member 44, and the tension post 41, as shown in FIG. 5, moves to the stop mode section "c" beyond the tension control section "a", of the tension arm 42, the damper pushing arm 81 of the tension arm 42 pushes the damper 80 counterclockwise, and the damper 80 moves beyond the tension control section "a", and the tension arm 42 receives a resisting force of the damper 80, so that the rapid movement of the tension arm 42 is advantageously restricted due to the above-mentioned operation.

When the tension arm 42 is in the tension control section "a", the tension arm 42 maintains a certain tension in cooperation with its original tension control function.

In addition, in the FF and REW modes, the other end of the damper pushing arm 82 of the tension arm 42 pushes the damper 80 clockwise, and the damper 80 moves to the tension control section "a" and the stop mode section "c", so that the damper pushing arm 82 receives a resisting force of the damper 80 at the time of returning to the stop mode.

In the cassette tape unloading mode, the damper pushing arm 82 of the tension arm 42 moves the damper clockwise, so that the damper 80 comes out of the unloading section "d".

As described above, the tape tension control apparatus for a VCR is directed to preventing the tape from getting out of the tension post when the tension arm rapidly moves in the tape loading mode, thus preventing damages of the tape. In addition, it is possible to remove the movement delay of the tension arm within the tension arm control section, so that a desired tension control function can be achieved.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A tape tension control apparatus for a video cassette tape recorder wherein a tension post is disposed between guide rollers and being in contact with an inner surface of a video cassette tape; a tension arm having one end thereof connected to said tension post and another end thereof being connected to a base plate; a tension applying means having an elastic member elastically connected to said tension arm; and a tension arm movement damping means disposed at a predetermined portion of the tension arm for preventing a rapid movement of the tension arm at the time of loading/unloading the video cassette tape.

2. The apparatus of claim 1, wherein said tension arm movement damping means is a movement damping means moving member which is projected from both sides thereof for damping the movement of the tension arm which is in contact with the tension arm movement damping means when the tension arm moves.

3. The apparatus of claim 1, wherein said movement damping means moving member is spaced apart by a certain distance in a tension control section of the tension arm so that the movement of the tension arm is not interfered with other elements.

4. A tape tension control apparatus for a video cassette tape recorder, comprising:

a base plate;

a shaft attached onto the base plate;

a tension arm rotatably attached onto the shaft, the tension arm having a first end and a second end;

an elastic member connected to the tension arm, allowing the tension arm to flexibly rotate about the shaft;

a tension guide post disposed at the first end of the tension arm, the tension guide post being in contact with and providing tension to a video tape which travels along an outer surface thereon;

a prolonged portion extending from the second end of the tension arm;

a damper means disposed on the base plate and adjacent to the prolonged portion of the tension arm, the damper means retardingly moving together with the tension arm, as the prolonged portion comes into contact with the damper means when the tension arm rotates upon loading and unloading of a video cassette tape.

5. The apparatus of claim 4, wherein the prolonged portion comprises a pair of damper pushing arms.

6. The apparatus of claim 5, wherein the pair of damper pushing arms form an obtuse angle therebetween to allow the tension arm to move without coming into contact with the damper means during video cassette tape recorder operations other than loading and unloading of the video cassette tape.

7. The apparatus of claim 4, wherein the damper means comprises:

a frame affixed to the base plate, the frame having a groove therein; and a damper being movably disposed within the groove of the frame, and moving together with the tension arm as the protrusion thereon applies a force to one end of the damper.

8. The apparatus of claim 7, wherein the frame and the damper are semicircular in shape.

* * * * *